May 30, 1944.  O. BORNEMANN  2,349,935
FLOATING SWIVEL RING FOR NONSKID CHAINS
Filed March 22, 1941
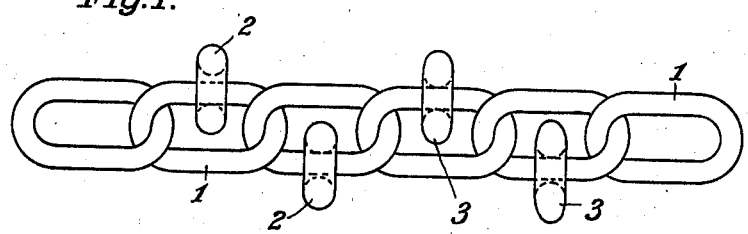
Fig.1.
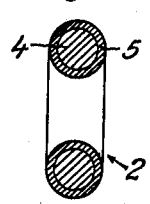
Fig.2.
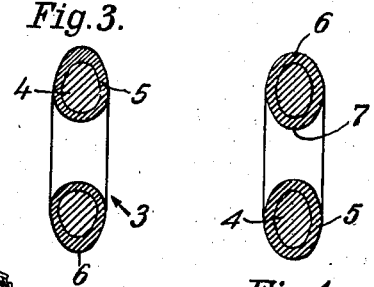
Fig.3.
Fig.4.
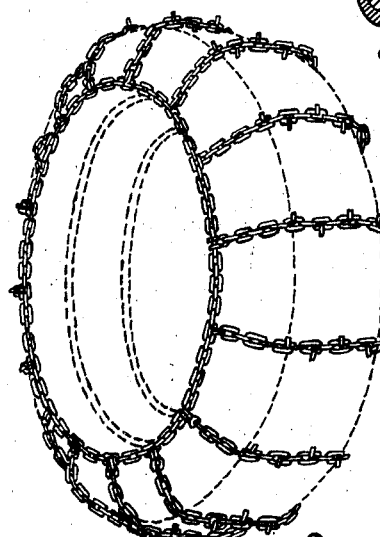
Fig.5.
Inventor
OTTO BORNEMANN
By
Young, Emery & Thompson
ATTYS.

Patented May 30, 1944

2,349,935

UNITED STATES PATENT OFFICE 2,349,935

FLOATING SWIVEL RING FOR NONSKID CHAINS

Otto Bornemann, Berlin, Germany; vested in the Alien Property Custodian

Application March 22, 1941, Serial No. 384,730
In Germany March 26, 1940

2 Claims. (Cl. 152—245)

The present invention relates to new and useful improvements in non-skid chains and it pertains more particularly to an improved conformation of the so-called floating swivel rings of such non-skid chains. Floating swivel rings, also called "gripper rings," are usually provided on those links of a non-skid chain which are disposed on the tread surface of a tire and thus are in contact with the road.

It is an object of the present invention to provide a new type of floating swivel rings which will efficiently protect the links of the non-skid chain from being too quickly worn out in use, will highly improve the gripping power of a non-skid chain mounted on a tire of a vehicle wheel, and also will effectively prevent the chain links from being covered with ice in which event their gripping effect would be practically annulled.

A further object of this invention is to provide a new type of floating swivel rings which will not be deformed by the high pressure and reaction forces to which they are subject in service. The swivel rings according to this invention are not easily deformed, so that they are capable under all circumstances of freely turning and axially moving on their respective chain links.

Still another object of this invention is to provide circular swivel rings having in a section taken through their axis of symmetry a shape elongated in a direction perpendicular to such axis, the body of said rings having thus an ovoid or elliptical or generally elongated cross sectional shape. As it will be seen from the following, such elongated conformation of the floating swivel rings will highly improve their resistance both to wear and to bending forces.

These and other objects of the invention will more fully appear from the following description of two preferred embodiments of same taken with reference to the accompanying drawing in which—

Fig. 1 represents a portion of a non-skid chain having on its left hand portion floating rings of a heretofore known type and on its right hand portion floating swivel rings made in accordance with the present invention.

Fig. 2 is an enlarged axial cross section of a floating swivel ring of a known type.

Fig. 3 is an enlarged axial cross section of a floating swivel ring according to one embodiment of this invention.

Fig. 4 is a similar cross section of a floating swivel ring according to another embodiment of this invention.

Fig. 5 represents in perspective view a nonskid chain provided with floating swivel rings according to this invention and mounted on a vehicle wheel.

Referring more particularly to Fig. 1 of the drawing the links of a tread portion of a nonskid chain are denoted by the reference mark 1, the floating swivel rings of a known type are designated by reference mark 2, whilst the floating swivel rings made in accordance with one embodiment of this invention bear the reference mark 3. The links of the non-skid chain may be somewhat twisted in the usual way not represented on Fig. 1. However Fig. 5 partly shows such provision.

The floating swivel rings according to this invention owing to the high stresses to which they are exposed, may be made—as with the usual swivel rings—either from a special naturally hard steel or from a ductile material subsequently hardened on its surface in any known manner.

As illustrated by Fig. 2, the known swivel rings have their axial cross section of a true circular shape. In Fig. 3 there is represented a floating swivel ring made either by bending from a ductile iron wire or by forging, swaging or stamping out from any suitable material having been subsequently treated by any known superficial hardening operation. The inner core of the ring body which has preserved its toughness is denoted by the reference mark 4, while the outer hardened layer by the reference mark 5. As represented, the hardened layer 5 of a known swivel ring 2 has a uniform thickness all around its core 4, said latter still having a substantial cross-sectional area for the purpose of preventing a cracking of the swivel ring under the forces, liable to act under operation. It must be appreciated that the thickness of the hardening layer 5 can be but a limited one if the cross-sectional area of the inner tough core 4 is not to be reduced below a necessary minimum.

It has been found that most exposed to wear is the outer peripheral surface of a swivel ring. Thereby with the known swivel rings of circular cross-section the hardened layer 5, on the outer portion of the ring, was not sufficient to withstand the strong wearing action exerted by the road.

Therefore a floating swivel ring according to this invention is formed in an expedite way so as to be of ovoid or elliptical or generally elongated cross section provided at least with an outwardly projecting tapering part extending around the outer circular periphery of the floating ring. Such is the case if the axial cross section of the circular ring body represents an outwardly tapering ovoid shape.

In Fig. 3 of the drawing a swivel ring according to this invention is represented having in axial cross section such an outwardly tapering ovoid shape. Owing to the core being elongated in an outward direction, such ring when subjected to a hardening treatment, has its outer peripheral extremity and its tapering portion more deeply hardened and hence more resistant to wear than the lateral and inner parts of such ring. The thicker hardened layer 6 formed on the outer surface of the ring 3 may be clearly seen in Fig. 3.

Furthermore it should be appreciated that a swivel-ring of elongated cross section has a higher moment of resistance to bending forces acting from the outside towards the axis of such ring and tending to bend it or to flatten out its circular shape.

Thereby it may be seen that the elongated cross sectional shape of the swivel ring according to this invention provides both for its increased resistance to bending forces and to wearing action.

It has been found with the known swivel rings of circular cross sectional shape that their hardened layer 5 has been worn out on its outer side after a relatively short period of service. Thereby such rings have been exposed to an increased wearing effect and to an increased danger of being deformed to such an extent as to be jammed on their respective chain links. Such rings are no more capable of rotating and moving axially on their links wherefore they are going to be worn out not uniformly on their entire circular periphery but only at one part thereof. They are soon worn out to such an extent that they are easily broken away and lost, exposing thus the links of the non-skid chain to excessive wear. Moreover, if the swivel rings are jammed on their chain links, they are no longer capable of preventing the accumulation of ice on the latter. Thereby the non-skid chain would lose its gripping power.

In the embodiment represented on Fig. 4 the floating swivel ring has an elliptical shape in axial cross section. During the hardening operation a hardened layer 5 is formed having a greater thickness both on the outer and on the inner side i. e. in those portions 6 and 7 of the ring which are nearest to and mostly remote from the axis of symmetry of the swivel ring. In this last mentioned embodiment of the invention the swivel ring is particularly well protected against wear both by its contact with the road and with its chain link.

As it has been explained above, the ovoid or elliptical cross-sectional shape of a swivel ring provides a higher resistance than if it is made of circular cross section. Therefore merely by this provision it is possible substantially to reduce the danger of such rings being deformed and jammed on their chain links. The high wear-resisting properties of the floating swivel rings according to this invention owing to the provision of an increased thickness of the hardened layer in those parts of the rings which are mostly exposed to wear have been explained above in detail. Furthermore it has been found that floating rings of ovoid and elliptical cross section will provide for a substantially increased gripping power of the non-skid chain on the ground. Finally the life of swivel rings having such cross section is considerably lengthened and thereby also the durability of the entire non-skid chain is substantially increased.

All of the above mentioned important advantages of the floating swivel rings according to this invention are obtained merely by forming the body of such rings in an elongated (ovoid or elliptical) axial cross-sectional shape. Furthermore it should be appreciated that the forming of a thicker hardened layer on those parts of such rings which are exposed to greater wear does not require more time than the forming of the heretofore usual hardened layer of uniform thickness around the body of the known swivel rings (Fig. 2). On the contrary, a hardening operation carried out on swivel rings according to this invention has an equal duration as that one carried out on swivel rings of the known type and it results in the inner core 4 being formed of substantially equal magnitude as with the known swivel rings. The thickness of the hardened layer obtained according to this invention on the less exposed parts of the ring body, is the same as that one of the hardened layer formed on the known swivel rings of circular cross section.

Though only two forms of floating swivel rings according to this invention and only one form of a non-skid chain provided with such floating rings have been represented, it has to be understood that various changes in the form, proportions, size and minor details of the structure of the floating rings and of the chain may be made without departing from the spirit or sacrificing any of the advantages of the invention.

From the foregoing it will be seen that the present invention provides a floating swivel ring in which the outer portion is (or in which the outer and inner portions are) particularly well protected against wear and wherein such ring is highly resistant to bending forces. Thereby the swivel rings according to this invention may freely rotate and be axially moved on their respective links, so as efficiently to protect them against the accumulation of ice and an excessive wear in use, while at the same time highly improving the gripping power of a non-skid chain. At the same time the swivel rings according to this invention are simple and cheap to manufacture.

What I claim is:

1. In an anti-skid chain for vehicle wheels, a floating ring adapted to roll freely on a portion of a cross-link of the chain, the metal of said ring for at least the exterior half of its cross-sectional area being of substantially semi-elliptical form with the major semi-axis of the ellipse extending radially of the ring.

2. In an anti-skid chain for vehicle wheels, a floating ring adapted to roll freely on a portion of a cross-link of the chain, the metal of said ring being of elliptical cross-section with the major axis of the ellipse extending radially of the ring.

OTTO BORNEMANN.